June 11, 1968    J. N. FRESH ET AL    3,387,685
EXPANDABLE AIR CUSHION VEHICLE
Filed March 31, 1966    3 Sheets-Sheet 1

INVENTORS
JOHN NORMAN FRESH
HARVEY R. CHAPLIN, JR.
BY
O.E. Hodges
ATTY.

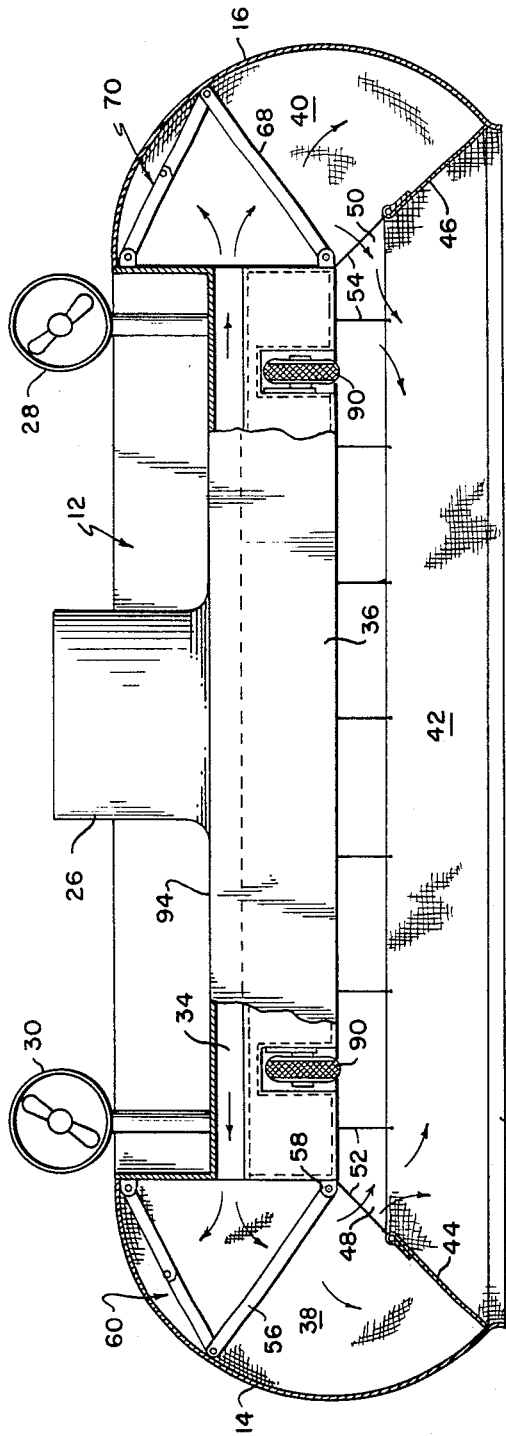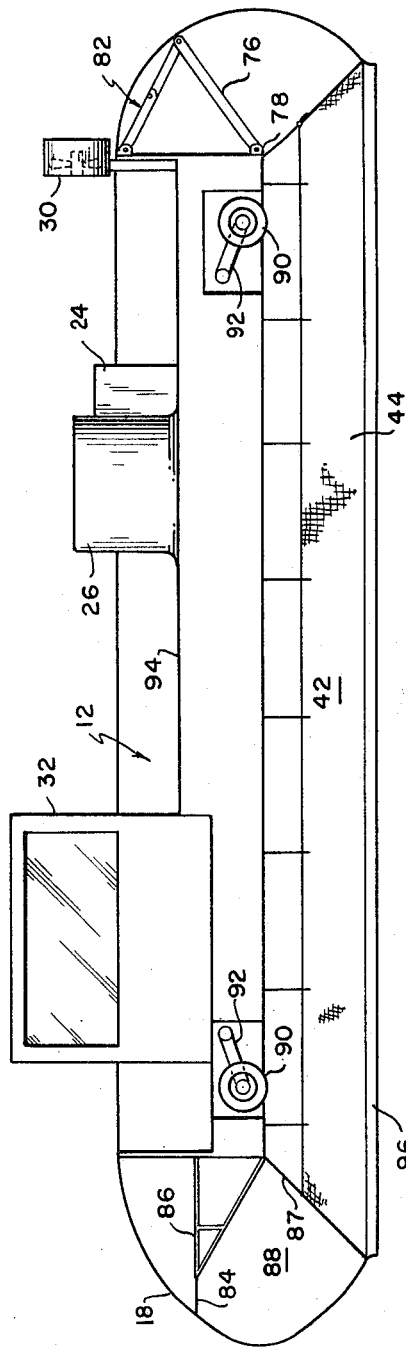

INVENTORS
JOHN NORMAN FRESH
HARVEY R. CHAPLIN, JR.
ATTY.

| United States Patent Office | 3,387,685
Patented June 11, 1968 |

3,387,685
EXPANDABLE AIR CUSHION VEHICLE
John Norman Fresh, Montgomery County, Md., and Harvey R. Chaplin, Jr., Arlington County, Va., assignors to the United States of America as represented by the Secretary of the Navy
Filed Mar. 31, 1966, Ser. No. 540,155
6 Claims. (Cl. 180—119)

ABSTRACT OF THE DISCLOSURE

An air cushion vehicle having flexible sides which are maintained in an expanded position by the same source of air used for maintaining the vehicle supporting air cushion. The flexible sides are capable of being expanded for supporting the vehicle on a cushion of air and capable of being folded to reduce the vehicle's overall size.

---

The invention described herein may be manufactured and used by or for the Government of the United States of America for governmental purposes without the payment of any royalties thereon or therefor.

The present invention relates to expandable air cushion vehicles and more particularly to an expandable air cushion vehicle that utilizes flexible expanding members.

Air cushion vehicles are being increasingly employed in overland and overwater travel. Generally, however, the present ACV's are deficient in several characteristics. Specifically, their load carrying ability is limited due to the weight of their structure and air distribution systems. The considerable weight involved requires high-power, cushion and propulsion engines. Further, this weight characteristic increases the expense of construction and operation of such a vehicle to the point where its use is economically feasible only in highly specialized applications.

An additional limitation in the vehicles of the prior art results from the requirement for a relatively large width in relation to length of the vehicle. This considerable width is necessary to provide adequate stability in roll when the vehicle passes over rough terrain or waves. Because of the width requirement, the vehicle becomes relatively unmaneuverable in close quarters, will not pass through narrow openings, and requires excessive storage space.

The vehicle of the present invention overcomes the disadvantages of the prior art by providing an expandable member on at least two sides of the vehicle whereby a lightweight vehicle with adequate stability in roll is produced. The expandable sides, in conjunction with supplemental wheels, additionally allow the vehicle to pass through narrow spaces and permit its storage in considerably reduced space.

It is therefore an object of the invention to provide an expandable air cushion vehicle.

It is another object of the invention to provide an expandable air cushion vehicle of reduced weight and complexity.

It is still another object of the invention to provide an expandable air cushion vehicle with flexible sides capable of being folded to reduce the vehicle's overall size for storage.

It is a further object of the invention to provide an expandable air cushion vehicle that is provided with means allowing a reduction of its overall width for movement in close quarters.

It is a still further object of the invention to provide an expandable air cushion vehicle with flotation means for safety in operation over water.

It is another object of the invention to provide an expandable air cushion vehicle wherein the expandable sides are maintained in their expanded position by the same source of air used to maintain the vehicle supporting air cushion.

Other objects and many of the attendant advantages of the invention will be readily understood by reference to the following detailed description of one specific embodiment thereof when considered in connection with the accompanying drawings, wherein:

FIG. 2 is a sectional view of the vehicle, taken along line 2—2 of FIG. 1;

FIG. 3 is a schematic side view of the vehicle, taken along line 3—3 of FIG. 1;

Figure 1:
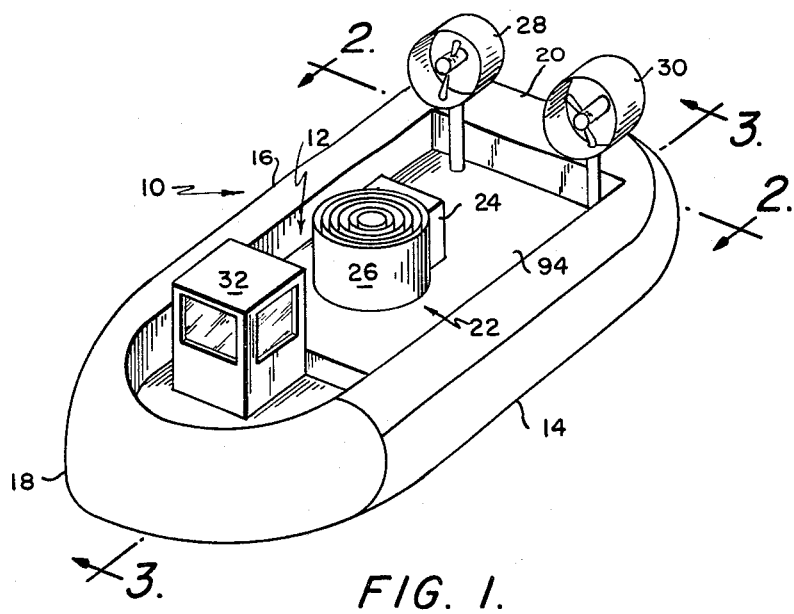
FIG. 1 is a perspective view of an air cushion vehicle embodying the invention.

In FIG. 1, there is shown an air cushion vehicle 10 (hereinafter referred to as ACV). The ACV includes a body portion 12 and expandable cover members 14, 16, 18 and 20.

The expandable members and the flexible members may be made of any suitable material that is flexible, substantially impervious to pressurized air, and that has good wear resistance. The material used in the instant embodiment is neoprene-impregnated nylon.

Located on the body portion is air pressure producing means 22 comprising, in the instant embodiment, an engine 24 and a compressor 26. Also on the body portion are mounted the propulsion means, or propeller and engine combinations 28 and 30. On the forward portion of the body is a control center means or pilot house 32.

Referring now to FIG. 2, body portion 12 is shown to include ducting 34 and a frame means or frame 36. The ducting 34 is in pneumatic communication with the compressor 26 and the interiors 38 and 40 of expandable members 14 and 16, respectively. Beneath the frame 36 and between the expandable members 14 and 16 is a chamber means or plenum chamber 42. Chamber 42 is separated from the interiors 38 and 40 of expandable members 14 and 16 by flexible members 44 and 46, respectively. Members 44 and 46 allow the passage of air from the compressor 26 to the chamber only through constricted spaces or passageways 48 and 50. Members 44 and 46 are held in spaced relation to the body portion 12 by securing members or wires 52 and 54 respectively.

On the left side of the vehicle as shown in FIG. 2, there is secured to the frame 36 a load transfer means or brace 56. The brace is U-shaped and extends along the side of the vehicle to a bracket identical to that shown at numeral 58. It is attached at its bight portion to the expandable member by suitable means (not shown) such as a fabric strip overlapping it and adhesively secured to the expandable member 14. The brace is shown in its operational position and is constrained in that position by a plurality of locking means or latching members, one of which is shown at 60. The operation of the locking members 60 is better understood by reference to FIG. 5 wherein the expandable member 14 and the brace 56 are shown in a partially folded position. The locking member 60 is there shown as being comprised of two links or arms 62 and 64 pivotally connected to each other and to the brace. The locking member arms may advantageously be made of U-shaped channel, one piece of channel being larger than the other so that the two pieces may be pivotally connected to one another by pin 66. The two pieces of channel nest one within the other and the brace may therefore be pivoted to a nearly vertical position when the expandable member is in a folded or retracted position against frame 36.

Figure 4:
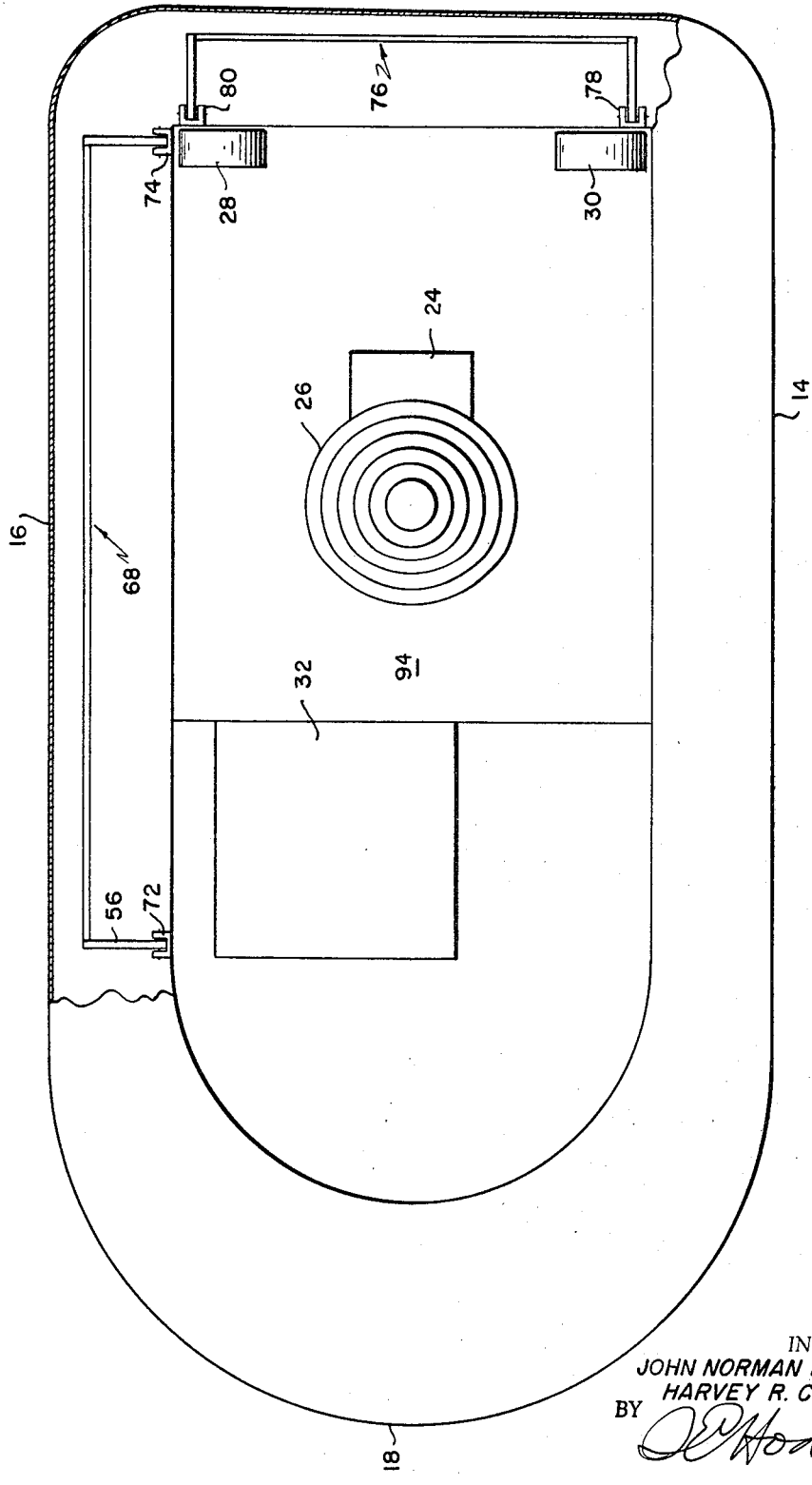
FIG. 4 is a top plan view, partly in section, of the vehicle.

On the right side of the vehicle as shown in FIG. 2 there is secured to the frame 36, a load transfer means 68 and its associated brace 70 which are substantially identical to load transfer means 56 and brace 60. FIG. 4 shows the load transfer member or brace 68 is shown in the cutaway portion of FIG. 4 which shows its U-shape and attachment to brackets 72 and 74.

A third load transfer member 76, shown in FIGS. 3 and 4, is similar to the two load transfer members previously described in that it is U-shaped (see FIG. 4), is pivotally attached to brackets 78 and 80, and has locking means or members, one of which is shown at 82 in FIG. 3.

Referring now specifically to FIG. 3, it can be seen that the expandable member 18 is not braced by a load transfer member but instead is connected by fabric hinge 84 to rigid bracket 86. Pressurized air from compressor 26 reaches expandable member 18 through interiors 38 and 40 of expandable members 14 and 16. A flexible member 87, seals the interior 38 from the plenum chamber 42.

It should be noted that load transfer means and locking means may be employed on expandable member 18. The configuration shown, however, provides increased flexibility as will be explained more fully hereinafter.

Although the vehicle of the invention is intended to operate primarily as an ACV, supplemental support means are provided to make possible the unique versatility of the vehicle. One part of the supplemental support means in this one specific embodiment assumes form of wheel means or wheels 90. These wheels may be of any suitable configuration but are shown in the specific embodiment to be retractable on members 92 which are pivotally connected to frame 36. The wheels may be powered or the vehicle may merely roll on them under the influence of the propulsion means 28 and 30.

Additional supplemental support means may be provided in the form of buoyant material (not shown) that is formed in the spaces between the structural members of frame 36. This material may be of any suitable type such as "Styrofoam." Being provided with such flotation, the vehicle is not dependent on its operation as a ACV when over water. The vehicle will float even with the expandable members folded and such operation may be advantageous to extend the duration of overwater trips and to allow low speed maneuvering. Further the flotation is a safety precaution should the compressor or the expandable members malfunction.

The general operation of the device will be described with reference to its use as a troop carrier or landing craft although, as will obviously appear, the vehicle has utility in many other areas of transportation.

In the selected embodiment shown in FIG. 1, the vehicle is shown as having a deck area 94 suitable for carrying personnel or cargo. Located centrally on the deck area is the air pressure producing means which may be of any suitable configuration but must be relatively light in weight and capable of supplying a sufficient supply of air to both support the craft on a cushion of air and to hold the expandable members in the expanded position. The propulsion means comprises two engine propeller combinations (engines not shown) that may swivel or pivot on their mountings to provide steering (pivoting means not shown). The arrangement shown has the advantage of providing excellent steerage, especially at low speeds, since steering is not dependent on air flow over control surfaces. Further, with dual propulsion sources, the power on each may be varied to produce additional steering thrust and, as a safety feature, the craft may be propelled with one propulsion source inoperative. However, it is contemplated that other propulsion sources may be employed, for example, a jet engine with which steering is accomplished by movable control surfaces, or a single propeller powered from the same source as the air pressure producing means.

The controls for both the air pressure producing means and the propulsion means are conveniently located at a single location, in this case, in the pilot house 32. The pilot house, as shown, is enclosed and is located well forward to increase visibility. It will be noticed that the deck portion on which the pilot house is located is somewhat below the level of the deck generally. The lowered portion permits carrying larger quantities of cargo or personnel and is made possible by the unique construction of the device, since no ducting to supply expandable member 18, is required.

According to the unique construction of the vehicle, the use of storage space is minimized by collapsing the expandable members. This is made possible by pivoting the load transfer members and their associated locking members to the folded position.

Figure 5:
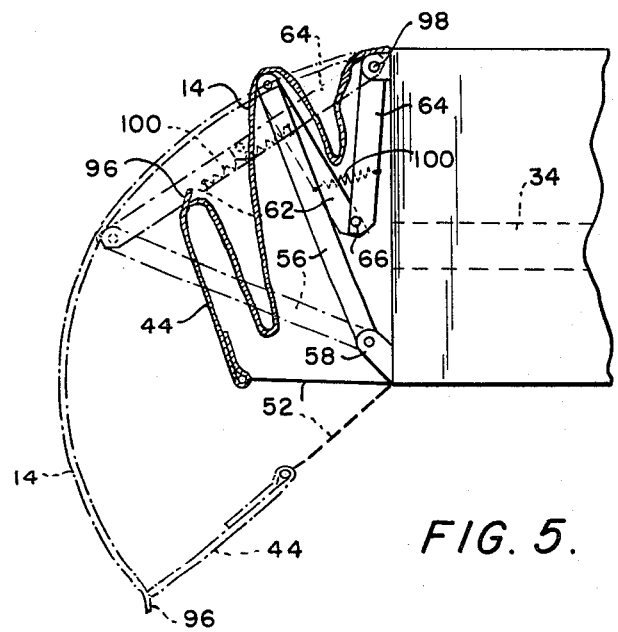
FIG. 5 is a detailed view of one of the unique folding devices of the invention shown in a partially collapsed position.

FIG. 5 shows one of the load supporting members in the partially folded position. For more complete folding, securing means such as elastic cords (not shown) may be secured between the fringe 96 of the expandable members and the rim 98 of the vehicle.

When it is desired to launch the craft from the deck of a ship, for example, it may be lowered over the side in its collapsed condition and allowed to float on its supplemental floatation while the expandable members are being readied for use. The securing means, if any, would be released and the load transfer members moved to their outermost position. This may be accomplished manually or on larger craft by electrical or hydraulic means. The locking members in the instant embodiment have an over-center spring 100 which releasably retains each locking member in its extended position.

With all the load transfer members extended, the air pressure supplying means will be operated and the air flow through duct 34 will inflate the expandable members to the condition shown in FIGS. 1, 2 and 3. The pressurized air flows from the interiors of the inflatable members through the spaces between the body and the flexible members. The width of the spaces may be varied by lengthening or shortening the securing wires, whereby the pressure in the interiors of the expandable members may be maintained above that produced in the plenum chamber 42 and the expandable members will thereby be maintained in the expanded condition.

With the air flowing into the plenum chamber, the vehicle will be lifted clear of the surface of the water and the propelling means actuated to provide forward motion.

Due to the unique construction employed, the vehicle has a wide beam which produces good roll characteristics in heavy seas or over rough terrain. Further the flexible nature of the expandable members permits the vehicle to pass over considerable sized waves or obstacles. This is made possible by the high underside clearance of the framework of the machine and by the flexibility of the expandable members, particularly on the front of the vehicle where there are no load transfer members to stiffen the expandable member.

The load transfer members on the remaining three sides operate to transfer the weight of the vehicle and its cargo to the expandable members at a point spaced from the points at which the expandable members are secured to the vehicle so as to prevent those members from pivoting about their points of attachment under load, and thereby reducing the terrain clearance of the frame member while increasing the load carrying capability. Thus, the craft is both flexible enough to maneuver over rough terrain or seas and yet is able to carry the required weight without deforming. These characteristics make it possible for the vehicle to pass through heavy surf to a beach and then up the beach and across land. Once upon land, if it becomes necessary to pass between trees or other obstructions, the width of the vehicle may be reduced by first extending the retractable wheels and then collapsing the expandable members. This mode of operation also makes travel over ordinary roads practical.

Obviously many modifications and variations of the present invention are possible in the light of the above teachings. It is therefore to be understood that within the scope of the appended claims the invention may be practiced otherwise than as specifically described.

What is claimed is:

1. An air cushion vehicle of variable lateral dimensions comprising:

a hollow body having a central frame therein defining an upper duct and a lower air cushion plenum chamber;

air pressure producing means on said vehicle for supplying air to the upper duct;

laterally expandable means on at least two sides of said body;

said laterally expandable means comprising a cover of flexible sheet material secured to said hollow body, and pivotable linkage means comprising a first linkage element hingeably connected at one end to said body and at the other end to said cover, and a second linkage element hingeably connected at one end to said body and at its other end to said first linkage element, said elements coacting to expand and retract said cover, said cover when retracted being folded back on itself to form a laterally restricted size and when expanded, extending the lateral air cushion area of said vehicle; and air distribution means for directing the supplied air from said upper duct via said expandable means to said plenum chamber.

2. Apparatus according to claim 1 wherein said first linkage element comprises:

brace means in the form of an elongated U, the inner end of each arm of the U being hingeably connected to the body and the outer ends of each arm to the arm-connecting member of the U, said connecting member being attached to the flexible cover at a portion between the top and bottom of said cover, the top of said cover being attached near the top of the vehicle sides;

and said second linkage element comprises pivotable two-member linkage means hingeably attached at one end near the top of the vehicle sides and at the other end hingeably to said U connecting member;

whereby upon rotation of the brace means to retract the cover, the two members overlie each other adjacently to said brace means, said cover being folded upon itself adjacent the sides of the vehicle body.

3. Apparatus according to claim 2 including wire means connecting the lower end of said cover to the lower portion of the vehicle body, whereby said cover when laterally expanded is held in a predetermined air-receiving shape by said wire means.

4. Apparatus according to claim 2 including internal flexible wall means between the lower portion of said cover and the vehicle body for confining the flow of air from said duct to said plenum chamber and for directing a portion of said air against the inner surface of the lower portion of the cover to bias said cover to an expanded position; and means attaching the lower extremity of the cover to a lower portion of the vehicle body for holding the cover in a predetermined expanded shape against the air biasing said cover toward its expanded position.

5. Apparatus according to claim 4 including means locking said brace means in an extended position.

6. Apparatus according to claim 4 including retractable wheel means mounted in said vehicle and buoyant means included in said body.

References Cited

UNITED STATES PATENTS 3,106,260 10/1963 Bollum _____ 180—7
3,177,960 4/1965 Cockerell _____ 180—7
3,321,039 5/1967 Watts _____ 180—7

A. HARRY LEVY, *Primary Examiner.*